United States Patent [19]

Jacobs et al.

[11] Patent Number: 4,828,202
[45] Date of Patent: May 9, 1989

[54] METHOD AND APPARATUS FOR WIDEBAND VIBRATION DAMPING OF REINFORCED SKIN STRUCTURES

[75] Inventors: Loyd D. Jacobs, Bellevue; Gautam SenGupta, Benton, both of Wash.; Byron R. Spain, Mulvane, Kans.

[73] Assignee: The Boeing Company, Seattle, Wash.

[21] Appl. No.: 297,945

[22] Filed: Aug. 31, 1981

Related U.S. Application Data

[63] Continuation-in-part of Ser. No. 79,325, Sep. 27, 1979.

[51] Int. Cl.⁴ ................................................. B64C 1/06
[52] U.S. Cl. ................................ 244/117 R; 188/268; 244/119; 181/208; 181/290
[58] Field of Search .................... 244/117 R, 119, 123, 244/131-133; 188/268; 52/730, 732, 828, 827, 309.3, 403; 181/257, 208, 286, 284, 290

[56] References Cited

U.S. PATENT DOCUMENTS

| | | | |
|---|---|---|---|
| 2,097,597 | 11/1937 | Pavlecka | 244/123 |
| 2,233,960 | 3/1941 | Woods | 244/123 |
| 2,233,969 | 3/1941 | Woods | 244/123 |
| 2,304,718 | 12/1942 | Swarl | 244/123 |
| 2,412,838 | 12/1946 | Shores . | |
| 2,427,853 | 9/1947 | Goodlett | 244/123 |
| 2,819,032 | 1/1958 | Detrie et al. | 244/119 |
| 2,877,970 | 3/1959 | Albertine et al. | 244/119 |
| 3,020,986 | 2/1962 | Kirk et al. . | |
| 3,029,910 | 4/1962 | Kirk et al. | 244/117 R |
| 3,029,914 | 4/1962 | Macomber . | |
| 3,058,704 | 10/1962 | Bergstedt | 244/119 |
| 3,071,217 | 1/1963 | Gould | 244/119 |
| 3,078,969 | 2/1963 | Campbell et al. | 188/1 B |
| 3,078,971 | 2/1963 | Wallerstein, Jr. | 188/1 B |
| 3,079,277 | 2/1963 | Painter . | |
| 3,080,022 | 3/1963 | Mote | 181/290 |
| 3,087,571 | 2/1963 | Kerwin, Jr. . | |
| 3,087,573 | 4/9163 | Ross . | |
| 3,087,574 | 4/1963 | Watters . | |
| 3,088,561 | 5/1963 | Ruzicka . | |
| 3,101,744 | 8/1963 | Warnaka | 188/1 B |
| 3,127,213 | 3/1964 | Klaasen . | |
| 3,142,610 | 7/1964 | Lowe . | |
| 3,159,249 | 12/1964 | Lazan | 188/268 |
| 3,160,549 | 12/1964 | Caldwell et al. | 188/1 B |
| 3,262,521 | 7/1966 | Warnaka | 188/1 B |
| 3,314,502 | 4/1967 | Thorn | 188/1 B |
| 3,327,812 | 6/1967 | Lazan | 188/1 B |
| 3,386,527 | 6/1968 | Daubert et al. | 181/208 |
| 3,401,907 | 9/1968 | McDermott . | |

(List continued on next page.)

FOREIGN PATENT DOCUMENTS

| | | | |
|---|---|---|---|
| 850389 | 9/1952 | Fed. Rep. of Germany | 244/119 |
| 796263 | 4/1936 | France | 244/123 |
| 513171 | 10/1939 | United Kingdom . | |

Primary Examiner—Galen Barefoot
Attorney, Agent, or Firm—Christensen O'Connor Johnson & Kindness

[57] ABSTRACT

A method and apparatus for damping the vibration of a reinforced skin structure (e.g., the fuselage of an aircraft) over a wide frequency range (wideband) in order to reduce the vibration and transmitted noise, and improve the sonic fatigue life, of the structure is disclosed. Wide range damping is accomplished by viscoelastically attaching constraining elements, which can be continuous or segmented, to the skin and to the reinforcing members that support the skin. The viscoelastic attachment between the constraining elements and the reinforcing members directly damp the vibrations of the reinforcing members; and, the viscoelastic attachment between the constraining elements and the skin directly damp the vibrations of the skin. Further, the regions of the constraining elements extending between the regions viscoelastically attached to the reinforcing members and to the skin forms a coupling that allows the skin viscoelastic attachment to indirectly damp the vibrations of the reinforcing member and vice versa. Resonant vibrations due to skin bending, torsional and extensional modes (both cylindrical and panel) and reinforcing member bending, torsional, extensional and tuning fork modes, are all damped.

51 Claims, 7 Drawing Sheets

U.S. PATENT DOCUMENTS

| | | | |
|---|---|---|---|
| 3,419,111 | 12/1931 | Jones et al. | 188/1 |
| 3,467,572 | 9/1969 | Ahramjian . | |
| 3,554,855 | 1/1971 | Oberst et al. . | |
| 3,601,228 | 8/1971 | Nashif | 188/1 B |
| 3,605,953 | 9/1971 | Caldwell et al. . | |
| 3,817,356 | 6/1974 | Dahlquist . | |
| 3,827,530 | 8/1974 | Heath | 188/1 B |
| 3,842,945 | 10/1974 | Potter . | |
| 3,872,950 | 3/1975 | Ashfield . | |
| 3,904,553 | 2/1976 | Hawkins | 174/42 |
| 3,976,269 | 8/1976 | Sen Gupta | 244/119 |
| 4,012,549 | 3/1977 | Slysh . | |
| 4,014,148 | 3/1977 | Harter | 52/403 |
| 4,096,307 | 6/1978 | Lagowski . | |
| 4,097,193 | 6/1978 | Brunsch et al. . | |
| 4,230,293 | 10/1980 | Hamm et al. . | |
| 4,313,524 | 2/1982 | Rose . | |

METHOD AND APPARATUS FOR WIDEBAND VIBRATION DAMPING OF REINFORCED SKIN STRUCTURES

This application is a continuation-in-part of U.S. patent application Ser. No. 079,325 filed Sept. 27, 1979 and entitled "Method and Apparatus for Wideband Vibration Damping of Reinforced Skin Structures".

TECHNICAL FIELD

This invention is directed to reducing the vibration and transmitted noise, and improving the sonic fatigue life, of reinforced skin structures and, more particularly, to reducing both the vibration and transmitted noise, and improving the sonic fatigue life, of reinforced skin structures by damping the vibration of the skin and reinforcing members used to form the reinforced skin structures.

BACKGROUND OF THE INVENTION

While the hereinafter described invention was conceived for use in reducing the noise in the cabin of an aircraft, it is to be understood that the invention can be used in other environments and reinforced skin structures to reduce interior noise and vibration. This includes all types of transportation vehicles—automobiles, buses, trucks, ships, submarines, hovercraft and hydrofoils, for examples. The invention can also be used in the exterior and interior walls of buildings and enclosures where high noise transmission reduction is desired. The invention can also be used on reinforced skin bulkheads, partitions or walls in any or all of the transportation vehicles listed above and others, including aircraft.

It is also to be understood that, because the interior noise is reduced by damping the vibrations of a reinforced skin structure, coincidental to the reduction of noise is a corresponding improvement in the sonic fatigue life of the structure and equipment attached to the structure. That is, reducing vibrations not only reduces noise, it also improves the sonic fatigue life of the vibrating structure and attached equipment.

Noise and vibration inside of a reinforced skin structure, such as the cabin of an aircraft, affects passenger speech communication, comfort and sleep. Noise and vibration also can cause fatigue and, thus, the malfunction of equipment mounted in regions of high noise and vibration. Since most transportation structures are designed to be as light in weight as possible (commensurate with structural requirements), in order to obtain maximum fuel efficiency, limitations are placed on what designers can do to reduce interior noise and vibration levels. These constraints are particlarly severe in the aircraft design field where weight is extremely critical.

In general, noise in an aircraft can be segregated into noise contributing to the overall sound pressure level (OASPL) and noise contributing to the speech interference level (SIL). The OASPL is essentially determined by the low frequency content of the noise and SIL is determined by the mid to high frequency content of the noise. Since both the OASPL and SIL affect passengers, a noise reduction over the entire audio frequency range and, in particular, the low and mid-audio frequency range is desirable. Correspondingly, the whole frequency range is an important contributor to noise and vibration induced fatigue and malfunctioning of equipment. In this regard, even though the following discussion centers on the reduction of interior noise for passenger comfort, the invention is equally applicable to reducing the detrimental effects of noise and vibration on equipment and structure.

Presently the interior or cabin noise of an aircraft in the mid and high frequency range (above 600 Hz) is reduced by applying skin damping tape, lead vinyl sheeting and fiberglass insulation to the walls of the aircraft fuselage. While the use of such items to reduce noise are effective in the mid and high frequency range, they are essentially ineffective in the low frequency range, particularly at frequencies below 300 Hz. Further, they are only moderately effective in the mid-frequency range between 300 and 600 Hz. As a result, the reduction of low and mid-frequency cabin noise has remained a problem in present commercial aircraft.

While, both low and mid-frequency cabin noise remains a problem in present aircraft, the problem is acute in recently developed short takeoff and landing (STOL) aircraft, such as externally blown flap (EBF) and upper surface blown (USB) aircraft. The problem is acute in such STOL aircraft because the level of low frequency interior noise is higher due to the proximity of the engines to the fuselage of the aircraft. As a result, it has now become even more desirable to provide improved methods and apparatus for reducing the OASPL and the SIL in the cabin of aircraft.

In the past, it was generally believed that cabin noise below about 600 Hz was controlled by the structural stiffness of the fuselage of the aircraft. Thus, attempts to reduce low and mid-frequency cabin noise were based on various methods of increasing fuselage structural stiffness. For example, in one attempt, the number of stringers in the fuselage of a modern aircraft were doubled to increase the structural stiffness of the fuselage and, thereby, reduce cabin noise. Test data taken on this aircraft indicated that although this 100 percent increase in stringer weight was partially effective in reducing cabin noise in the mid-frequency range (e.g., 300–600 Hz), it was ineffective in the low frequency range (e.g., below 300 Hz). Thus, although this change improved the subjective impression of the noise level in the cabin of the aircraft, the overall sound pressure level (OASPL) was virtually uneffected.

In recent years, it has been found that during cruise, when the pressurization loads cause the skin panel frequency of an aircraft to be higher than the stringer frequency, the coupled mode of the overall reinforced skin structure is such that the skin acts like a very stiff member, supported by relatively flexible stringers. In this regard, attention is directed to U.S. Pat. No. 3,976,269 entitled "Intrinsically Tuned Structural Panel" by Gautam SenGupta. This coupled mode is a very strong radiator of sound because a large section of the skin vibrates in phase. That is, the individual sections of the skin vibrate in phase, whereby vibrations combine to form noise sources having a relatively high magnitude. Since the skin responds like a very stiff member, very little skin flexural bending takes place. As a result, the application of damping devices (e.g., damping tape) to the skin is not very effective in reducing the low frequency noise produced by such structures. On the other hand, the vibration response of this coupled mode is strongly determined by the deflection of the relatively flexible stringers. As a result, damping the stringers is a very effective way of reducing the low frequency response of the overall structure.

A method and apparatus for significantly reducing the noise produced by stringer response is described in U.S. patent application, Ser. No. 029,705, entitled "Method and Apparatus for Reducing Low to Mid-Frequency Interior Noise," filed Apr. 11, 1979, by Gautam SenGupta and Byron R. Spain. This patent application describes reducing stringer response to vibration disturbances by applying rigid strips across the stringer flanges, the rigid strips being attached to the flanges by thin viscoelastic layers. This method of stringer damping has been found to reduce structural vibration and cabin noise during cruise in the low frequency range.

While stringer damping using the method and apparatus described in the foregoing patent application is effective in reducing noise when stringer vibration is the dominant noise source, when skin vibration is the dominant noise source, this method is ineffective. In this regard, during takeoff skin vibration is the dominant noise source in most presently designed aircraft. In order to overcome this problem, the foregoing patent application teaches forming the aircraft fuselage such that the fundamental frequency of the skin is higher than the fundamental frequency of the skin supporting stringers. However, unless this is achieved through cabin pressurization, this approach can lead to an increase in the weight of the aircraft. Alternatively, separate devices can be used to damp skin vibrations. The separate devices must cover substantially the entire skin area and, thus, add a substantial amount of weight.

In summary, prior to the present invention, reinforced structures, such as the reinforced skin structures forming the fuselage of an aircraft, have had one type of dampling applied to the reinforcing members, e.g., stringers and frame members, and another type of damping applied to the skin. In this manner, whichever element is dominant with respect to vibrational response is damped. However, the damping treatments do not cooperate such that each damping treatment assists the other damping treatments when the other damped structural element creates the dominant response to a vibrational disturbance. Because of a lack of cooperation, the total amount of weight added is higher than desired. In this regard, it should be noted that in order for prior art skin damping to be effective it had to be applied to large areas of the skin. The use of damping materials in isolated regions, such as the center of skin panels was ineffective in reducing noise. Alternatively, it has been proposed to form the structure such that reinforcing member vibration is dominant; and, to damp the vibrations of the reinforcing member. This approach has the disadvantage of increasing the weight of the structure as a result of the additional reinforcing members needed to produce the necessary skin stiffness.

Therefore, it is an object of this invention to provide a new and improved method and apparatus for damping the vibrational response of reinforced structures.

It is also an object of this invention to provide a new and improved method and apparatus for damping the vibrational response of reinforced skin structures.

It is another object of this invention to provide a wideband cabin noise and vibration reduction method and apparatus for use with a reinforced skin structure.

It is a still further object of this invention to provide a wideband reinforced skin structure vibration damping method and apparatus that functions to damp the vibrational response of both the skin and the skin reinforcing members of a reinforced skin structure.

SUMMARY OF THE INVENTION

In accordance with this invention, a method and apparatus for damping the vibrations of a reinforced structure, particularly a reinforced skin structure (e.g., the fuselage of an aircraft), over a wide frequency range in order to reduce the vibration and transmitted noise, and improve the sonic fatigue life, of the structure is disclosed. Wide range damping is accomplished by viscoelastically attaching constraining elements, which can be continuous or segmented, between the reinforcing members and/or between the reinforcing members and the skin supported by the reinforcing members. The viscoelastic attachment between the constraining member and the reinforcing members directly damps the vibrations of the reinforcing members; and, the viscoelastic attachment between the constraining member and the skin directly damps the vibrations of the skin. Further, the region of the constraining member extending between the regions attached to the reinforcing members and/or to the skin forms a coupling that allows the viscoelastic attachment to the nonvibrating element or elements to indirectly damp the vibrations of the vibrating element.

Regardless of whether continuous or segmented, the constraining elements joining the skin to the reinforcing members that support the skin are in the form of an elongated strip or sheet having a corrugated, longitudinal, cross-sectional configuration. More particularly, the corrugated cross-sectional configuration is such that the corrugations are in the form of spaced apart regions joined together by inclined regions. Alternate spaced apart regions are viscoelastically attached to the skin and to the skin supporting reinforcing members. The inclined regions form the coupling region that couples the viscoelastically attached spaced apart regions together. The constraining elements can be formed of any material having a modulus of elasticity lying generally within one order of magnitude or more of the modulus of elasticity of the material used to form the reinforcing members of the reinforced skin structure.

If desired, apertures can be formed in appropriate regions of the constraining elements to provide weight reduction. In addition, the inclined regions of the constraining element can be stiffened to prevent buckling. For example, edges of the inclined regions can be bent outwardly. Longitudinal stiffening can also be provided by one or more indentations in the inclined region of the constraining element.

The segmented embodiments of the constraining member are formed such that the spaced apart regions overlap where the segments join. The overlapping may occur where the regions are attached to the reinforcing member or where the regions are attached to the skin or in both areas. Further, the portion of the constraining element viscoelastically attached to the reinforcing member and/or the skin may be wider than the other portions of the constraining elements to better damp flexural bending deflections of the reinforcing member and/or the skin, as well as damp torsional and other deflections.

Constraining elements running between two reinforcing members, such as a frame and a stringer of an aircraft fuselage, also may be continuous or segmented. Further, such constraining elements may be separate from or unitary formed with constraining elements running between the reinforcing members and the skin. Also, the portion of the constraining elements running between the reinforcing members and/or the skin may include a lap joint with the overlapping portions attached by a layer of viscoelastic material.

It will be appreciated from the foregoing summary that the invention provides a method and apparatus for damping the vibrations of a reinforced skin structure by using constraining elements viscoelastically attached to both the reinforcing members and the skin of a reinforced skin structure. The viscoelastic attachment layers coact to provide both direct and indirect damping of both the reinforcing members and the skin. As a result, both the skin and the reinforcing members are vibration damped by common components. Because vibrational response is damped, the noise produced as a result of such vibrational response is reduced. Coincidentally, the sonic fatigue life of the damped skin and reinforcing members is improved. The invention is functional over a wide frequency range, including low frequencies (e.g., those below 300 Hz), mid-frequencies (e.g., those between 300 and 600 Hz) and high frequencies (e.g., those above 600 Hz). Further, the beneficial results are achieved by adding a minimal amount of weight. In this regard, the size of the regions of the constraining elements attached to the skin may be varied from a partial to a nearly full coverage overlay of the skin panels, between the reinforcing members.

BRIEF DESCRIPTION OF THE DRAWINGS

The foregoing objects and many of the attendant advantages of this invention will become more readily appreciated by reference to the following detailed description of preferred embodiments of the invention when taken in conjunction with the accompanying drawings wherein.

DESCRIPTION OF THE PREFERRED EMBODIMENTS

This invention is directed to a method and apparatus for damping the vibrations of a reinforced skin structure, such as the fuselage of an aircraft, over a wide frequency range in order to reduce the interior noise and improve the sonic fatigue life of the structure. The method of the invention generally comprises the steps of viscoelastically attaching constraining elements between reinforcing members, and/or the reinforcing members and the skin supported by the reinforcing members. The constraining elements can be continuous or segmented. The constraining elements reduce the vibration of both the skin and the reinforcing members in two ways. First, the viscoelastic attachment between the constraining elements and each item (e.g., the reinforcing members and the skin) directly damps the vibration of the item. Second, because the viscoelastic attachments are coupled together by the constraining elements, the viscoelastic attachment between the constraining elements and the other item(s) indirectly damps the vibration of the vibrating item. For example, the vibration of the skin is indirectly damped by the viscoelastic attachment between the constraining element and the reinforcing members. And the vibration of the reinforcing members is indirectly damped by the viscoelastic attachment between the skin and the constraining element. In the case where two reinforcing members are joined by a constraining element viscoelastically attached to both reinforcing members, the vibration of one reinforcing member is directly damped by the viscoelastic attachment between it and the constraining element and indirectly damped by the viscoelastic attachment between the other reinforcing member and the constraining element.

FIGS. 1-19 illustrate various embodiments of constraining elements formed in accordance with the invention. The illustrated embodiments include both continuous and segmented constraining elements.

Figure 1:
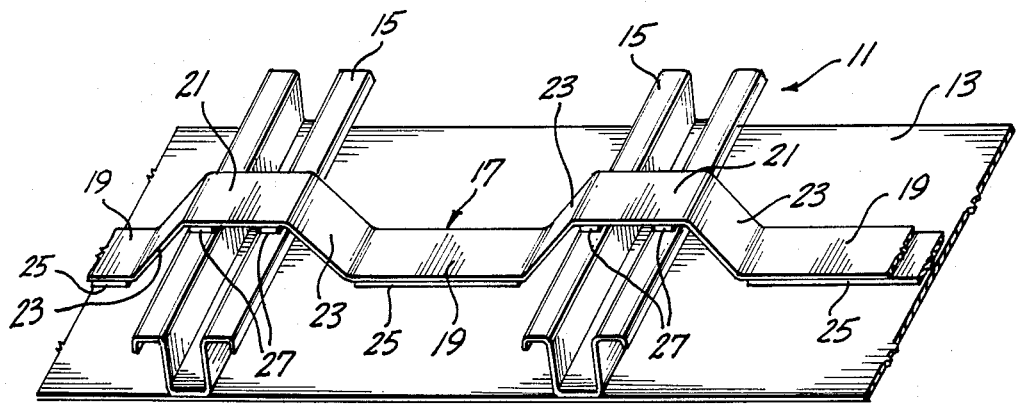
FIG. 1 is a perspective view of one embodiment of a constraining element formed in accordance with the invention.

FIG. 1 illustrates a portion of a reinforced skin structure 11 comprising a skin 13 and a plurality or reinforcing members, illustrated as parallel oriented top-hat stringers 15. That is, the illustrated stringers have the cross-sectional configuration of a "top-hat", i.e., they are U-shaped and have flanges that extend outwardly from the ends of the legs that define the U-shape. As will be readily appreciated by those familiar with the construction of aircraft, a reinforced skin structure 11 of the type illustrated in FIG. 1 is commonly utilized to form the fuselage of an aircraft. In this regard, the skin 13 is attached to the cross-member of the top-hat stringers 15. Thus, the flanges of the top-hat stringers 15 are remote from the skin 13. The stringers, in turn, are generally supported by frames (not shown). Alternatively, in stringerless sidewall structures, only frames are included to reinforce the skin. In such configurations, the skin is attached to the frames directly, i.e., the frame replaces the stringer in the FIG. 1 illustration. Further, in still other structures, the stringer could be a stud, beam or other structural reinforcing member. Finally, as hereinafter discussed in more detail, the cross-sectional configuration of the stringer or other reinforcing member may have a shape other than that of a "top-hat."

FIG. 1 also illustrates a continuous constraining element 17 formed in accordance with the invention. Preferably, the continuous constraining element is formed of an elongated, flat material, such as metal, plastic or fiber composite. For best results the modulus of elasticity of the constraining element should be equal to, or greater than, the modulus of elasticity of the skin and/or the reinforcing members. The elongated constraining element has a corrugated cross-sectional configuration when viewed in a longitudinal plane. That is, the longitudinal cross-sectional configuration of the constraining element is such that alternating spaced apart regions 19 and 21 are joined by inclined regions 23. Another way of defining the longitudinal cross-sectional configuration of the constraining element 17 is that its shape generally defines a plurality of alternatingly oriented trapezoids when placed between two parallel lines.

The constraining element 17 is positioned so as to lie transverse to the longitudinal axis of the stringers 15 and such that one alternating set of spaced apart regions 19 overlies the skin 13 and the other set 21 overlies the flanges of the stringers 15. Located between the skin and the set of spaced apart regions 19 that overlie the skin 13 are constraint-to-skin viscoelastic layers 25. Located between the flanges of the stringers 15 and the spaced apart regions 21 of the constraining element 17 that overlie the stringers are constraint-to-stringer viscoelastic layers 27.

Preferably, the viscoelastic material used to form the viscoelastic layers has a vibration to internal heat energy dissipation peak that lies at or near the temperature of the environment in which the reinforced skin structure is used. More specifically, as will be readily appreciated by those familiar with viscoelastic materials, viscoelastic materials damp vibration by dissipating vibration energy as heat. As will also be appreciated by those familiar with viscoelastic materials, the magnitude of the vibration energy that can be converted to heat by a particular material peaks at a certain temperature. As a result, in order to obtain the maximum energy dissipation available, it is desirable to choose a viscoelastic material that "peaks" at the temperature of the environment in which the reinforced skin structure is to be used. Alternatively, if a viscoelastic material cannot be chosen that peaks in this temperature range, the chosen viscoelastic material should have a peak as near to this temperature as possible. Viscoelastic materials suitable for use in aircraft are sold by the Minnesota Mining and Manufacturing Company under the product identification numbers ISD-112 (peaks at room temperature—70° F.), ISD-113 (peaks in the 0° to +15° F. range) and ISD-830 (peaks in the 0° to −20° F. range). Since these particular products are self-adhesive, a separate adhesive material for attaching the viscoelastic layers to the constraining elements, flanges of the stringers and the skin is unnecessary. Preferably, the thickness of the viscoelastic layers falls in the 0.010–0.020 inch range for typical commercial airplane fuselage structures. In addition to being temperature sensitive, the energy dissipation characteristics of viscoelastic materials are also frequency dependent. Therefor, the viscoelastic material chosen for use in an actual embodiment of the invention should have a peak frequency of energy dissipation lying within the frequency range of interest. Further, two or more viscoelastic materials can be combined to broaden both the temperature and frequency dissipation range of an actual embodiment of the invention.

As noted above, the constraining element 17 provides vibration damping in various ways. First, the constraint-to-stringer viscoelastic layers 27 attached to the flanges of the top-hat stringers 15 directly damp stringer vibration. Stringer vibration is damped in the manner described in U.S. patent application Ser. No. 029,705, entitled "Method and Apparatus for Reducing Low to Mid-Frequency Interior Noise," filed Apr. 11, 1979 by Gautam SenGupta and Byron R. Spain, referenced above. Bending, torsion and tuning fork vibration modes are all damped by the stringer viscoelastic layer. (The tuning fork mode involves the inward and outward motion at the legs of the "top-hat" stringer that define the U-shape.) Similarly, the constraint-to-skin viscoelastic layers 25 directly damp skin vibrations. Both cylindrical and panel skin vibration modes are damped. In addition to direct damping, indirect damping is provided. Specifically, when the stringers vibrate, their motion is coupled to the constraint-to-skin viscoelastic layers 25 via the inclined regions. Thus, the constraint-to-skin viscoelastic layers assist in stringer vibration damping. Similarly, when the skin vibrates, its motion is coupled to the constraint-to-stringer viscoelastic layers via the inclined regions. Thus, the constraint-to-stringer viscoelastic layers assist in damping skin vibrations. This arrangement reduces weight by reducing the total amount of viscoelastic damping area covered by the direct damping layer required to damp vibrations of a particular magnitude. In this regard, the constraint-to-skin viscoelastic layers need not cover large areas of the skin. Specifically, placing the set of spaced apart regions 19 that overlie the skin in the center of the skin panels, between the stringers, rigidly couples the center or maximum vibration area to a stringer. This arrangement restrains the area of maximum skin vibration to effectively restrain the vibration of other skin regions. Since the skin overlying spaced apart regions 19 do not cover the entire skin area, weight is reduced without a significant reduction in vibration damping effectiveness. Alternatively, the spaced apart regions 19 that overlie the skin 13 may cover a substantial portion of the skin. Moreover, these regions may be wider than the width of the inclined regions 23 and the spaced apart regions 21 that overlie the stringers 15. Further, single or multiple constraining elements asymetrically placed between the stringers and the stringers (i.e., displaced from the skin centerline) can be used to damp anti-symmetric vibration modes which have node points at the skin panel center.

Figure 2:
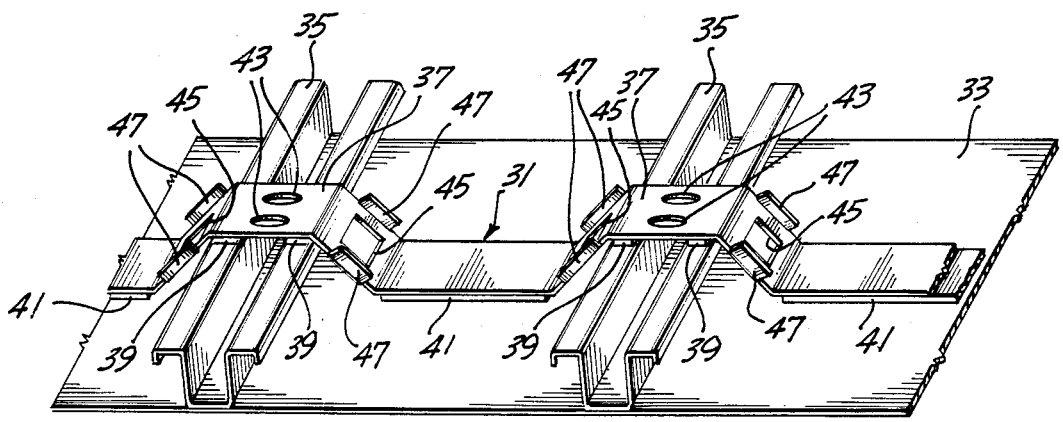
FIG. 2 is a perspective view of an alternative embodiment of a constraining element formed in accordance with the invention.

FIG. 2 illustrates an alternative embodiment of a continuous constraining element 31. More specifically, FIG. 2 illustrates a skin 33 supported by a plurality of parallel oriented top-hat stringers 35. The cross-sectional configuration of the constraining element 31 is generally similar to the cross-sectional configuration of the constraining element 17 illustrated in FIG. 1. That is, the longitudinal, cross-sectional configuration of the constraining element 31 is corrugated. Moreover, as with FIG. 1, the constraining element 31 illustrated in FIG. 2 lies transverse to the longitudinal axis of the stringers 35 and such that one set of alternating spaced apart regions 37 of the constraining element 31 overlie and are viscoelastically attached to the flanges of the stringers 35 by constraint-to-stringer viscoelastic layers 39. In addition, the other set of spaced apart regions of the constraining element 31 are attached to the skin 33 between the stringers 35 by constraint-to-skin viscoelastic layers 41.

The primary difference between the constraining element 31 illustrated in FIG. 2 and the constraining element 17 illustrated in FIG. 1 is that the constraining element illustrated in FIG. 2 includes circular apertures 43 located between the flanges of the stringers 35. Further, rectangular apertures 45 are located in the inclined regions of the constraining element. The circular and rectangular apertures 43 and 45 reduce the weight of the constraining element. Obviously the apertures can have shapes other than circular or rectangular, if desired.

In addition to reducing the weight of the constraining element, FIG. 2 also illustrates the use of edge flanges 47 to strengthen the inclined regions of the constraining element 31. That is, an edge flange 47 is located along either edge of the inclined regions of the constraining element 31. The flanges 47 are formed in a unitary manner with the constraining element and extend orthogonally outwardly so as to longitudinally stiffen the inclined regions of the constraining elements. The thusly stiffened inclined regions better resist buckling than nonstiffened inclined regions. Other methods of stiffening the constraining elements can also be used including the incorporation of a corrugation along the edge of the rectangular apertures 45 in place of the edge flanges 47. Local stiffening of the inclined regions of the constraining element 31 can also be achieved by bonding another layer of material to the inclined region, the other layer being formed of any material suitable for forming a constraining element, discussed above.

Since the operation of the constraining element 31 illustrated in FIG. 2 is identical to the operation of the constraining element 17 illustrated in FIG. 1, the operation of the FIG. 2 constraining element will not be described here. Similarly, except where differences exist, the operation of the remaining embodiments of the invention illustrated in the accompanying drawings will not be described in detail. Further, it is to be understood that the modifications discussed above with respect to FIG. 1 are equally applicable to the other embodiments of the invention hereinafter described (and vice versa) even though they may not be specifically stated during the description of each embodiment. In this regard, even though the reinforcing member is denoted a stringer and referred to as such throughout the descriptions of the various embodiments of the invention illustrated in FIGS. 1–18, the reinforcing member could be a frame, stud, beam or the like structural reinforcing member, as illustrated in FIG. 19 and hereinafter described. Further, the spaced apart regions of the constraining element that overlie the skin may be narrow or wide, as desired.

Figure 3:
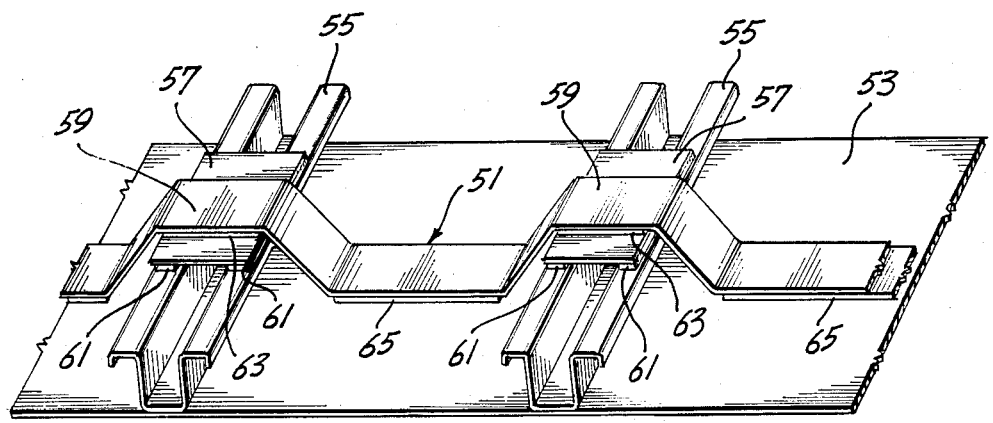
FIG. 3 is a perspective view of another embodiment of a constraining element formed in accordance with the invention.

FIG. 3 illustrates a further alternative embodiment of a continuous constraining element 51 formed in accordance with the invention. More specifically, FIG. 3 illustrates a skin 53 attached to the cross-members of a plurality of parallel oriented top-hat stringers 55. Again, the continuous constraining element 51 has a corrugated configuration when viewed in longitudinal cross-section; and, alternating sets of spaced apart regions are viscoelastically attached to the skin 53 and to the flanges of the stringers 55. The primary difference between FIGS. 3 and 1 is that FIG. 3 includes plates 57 mounted between the spaced apart regions 59 of the constraining element 51 that overlie the flanges of the stringers 55, and the flanges of the stringers. More specifically, the plates 57 are attached to the flanges of the stringers 55 by plate-to-stringer viscoelastic layers 61. The spaced apart regions 59 that overlie the stringers 55 are viscoelastically attached to the plates 57 by constraint-to-plate viscoelastic layers 63. The dimension of the plates 57 parallel to the longitudinal axis of the stringers 55 is greater than the width of the constraining element 51 in the same direction. As a result, the plate 57 provides greater vibration damping along the longitudinal axis of the stringers 55 than the directly connected spaced apart regions 21 of the constraining element illustrated in FIG. 1. In essence, the plates 57 provide the majority of stringer damping, including tuning fork, bending and torsional damping. The constraint-to-plate viscoelastic layer 63 located between the plates 57 and the constraining element 51 provide some additional stringer damping. Conversely, the plate-to-stringer viscoelastic layer 61 augments the constraint-to-plate viscoelastic layer 63 and constraint-to-skin viscoelastic layers 65. In other words, all of the viscoelastic layers augment one another.

As with the embodiment of the constraining element illustrated in FIG. 2, if desired, selected spaced apart regions, including the inclined regions of the constraining element illustrated in FIG. 3 can be apertured to reduce weight. Similarly, apertures can be formed in the plate 57 between the flanges of the stringers 55 to reduce weight. Further, the inclined regions of the constraining elements 51 can be stiffened, if desired, by various methods including outwardly bent flanges formed along the edges of the inclined regions of the constraining elements 51.

Figure 4:
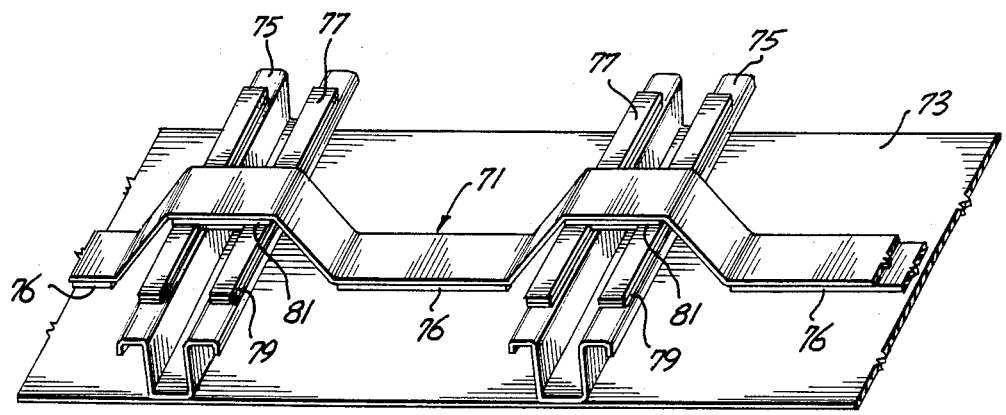
FIG. 4 is a perspective view of a further embodiment of a constraining element formed in accordance with the invention.

FIG. 4 illustrates a still further alternate embodiment of a continuous constraining element 71 formed in accordance with the invention. More specifically, FIG. 4 illustrates a skin 73 attached to a plurality of parallel oriented, top-hat stringers 75. The constraining element 71 is generally similar to the constraining element illustrated in FIG. 1 in that it has a corrugated, longitudinal, cross-sectional configuration. One alternating set of spaced apart regions of the constraining element 71 is viscoelastically attached to the skin 73 by constraint-to-skin viscoelastic layers 76. The other set of spaced apart regions is indirectly viscoelastically attached to the stringer 75. More specifically, as with FIG. 3, an intermediate member is located between the spaced apart regions of the constraining element 71 that overlie the flanges of the stringers 75 and the stringers. In the case of FIG. 4, the intermediate member is an H-shaped plate 77, rather than a solid plate, as illustrated in FIG. 3 and previously described. The legs of the H-shaped plate 77 lie parallel, and are viscoelastically attached, to the flanges of the stringers 75 by plate-to-stringer viscoelastic layers 79. The cross-member of the H-shaped plate 77 lies beneath the overlying portion of the constraining element 71 and is viscoelastically attached thereto by a constraint-to-plate viscoelastic layer 81.

As with the other embodiments of the invention, if desired, the constraining element 71 may be apertured to reduce weight. In addition, outwardly projecting flanges or other forms of stiffening can be located in the inclined regions of the constraining element 71 to stiffen these regions.

Figure 5:
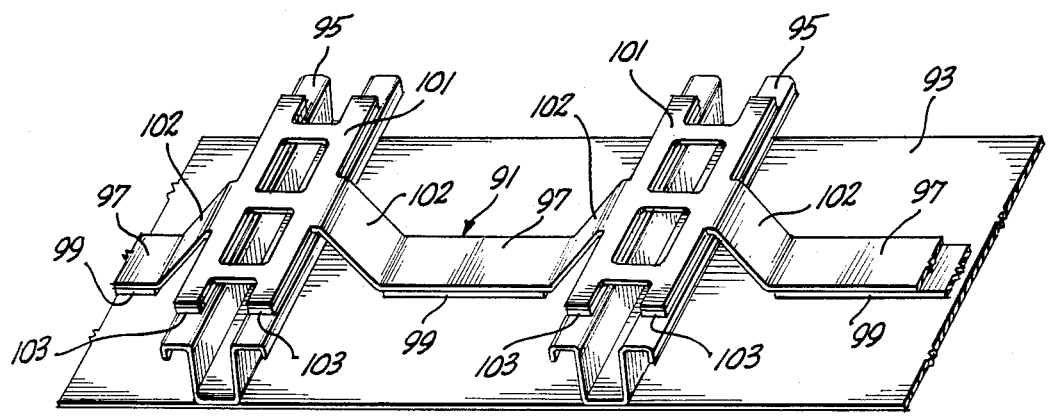
FIG. 5 is a perspective view of still another embodiment of a constraining element formed in accordance with the invention.

FIG. 5 illustrates a still further alternative embodiment of a continuous constraining element 91 formed in accordance with the invention. The constraining element 91 illustrated in FIG. 5, in essence, combines the plates and constraining elements illustrated in FIGS. 3 and 4 into a unitary member. More specifically, as with the previously described embodiments, FIG. 5 illustrates a skin 93 affixed to a plurality of parallel oriented, top-hat stringers 95. The constraining element 91 has a corrugated cross-sectional configuration in the longitudinal direction. One set of spaced apart regions 97 of the constraining element 91 is attached to the skin 93 by constraint-to-skin viscoelastic layers 99, between the stringers 95. The other set of spaced apart regions 101 is attached to the flanges of the stringers 95 by constraint-to-stringer viscoelastic layers 103. The difference between FIG. 5 and the previously described embodiments of the invention lies in the shape of the spaced apart regions 101 of the constraining element 91 that overlie the stringers 95. More specifically, the spaced apart regions 101 of the constraining element 91 that are viscoelastically attached to the flanges of the top-hat shaped stringers 95 are substantially wider than the inclined regions 102 of the constraining element and the spaced apart regions 97 attached to the skin 93. The wider spaced apart regions attached to the flanges of the stringers 95 include a pair of elongated legs that lie parallel to and are viscoelastically attached to the flanges of the stringer 95 by the constraint-to-stringer viscoelastic layers 103. Connecting the elongated legs are a plurality of unitary cross-members, which span the region between the flanges of the stringers 95. Thus, the spaced apart regions of the constraining element 91 attached to the stringers 95 have the configuration of an apertured elongated plate. The elongated plates are formed unitarily with the inclined regions 102 of the constraining element 91 which, in turn, are formed unitarily with the spaced apart regions 97 of the constraining element attached to the skin 93.

As with the FIG. 2 embodiment of the invention, if desired, the inclined regions 105 of the constraining element 91 illustrated in FIG. 5 can be apertured to reduce weight and include outwardly extending flanges along their longitudinal edges (or other forms of stiffening) to stiffen these regions and inhibit buckling. Further, the spaced apart regions 97 overlying the skin may be substantially wider than illustrated in FIG. 5, as discussed above.

As will be appreciated from the foregoing description, FIGS. 1-5 illustrate embodiments of a constraining element formed in accordance with the invention that are continuous. Contrariwise, the FIGS. 6-10 illustrate constraining elements that are segmented.

Figure 6:
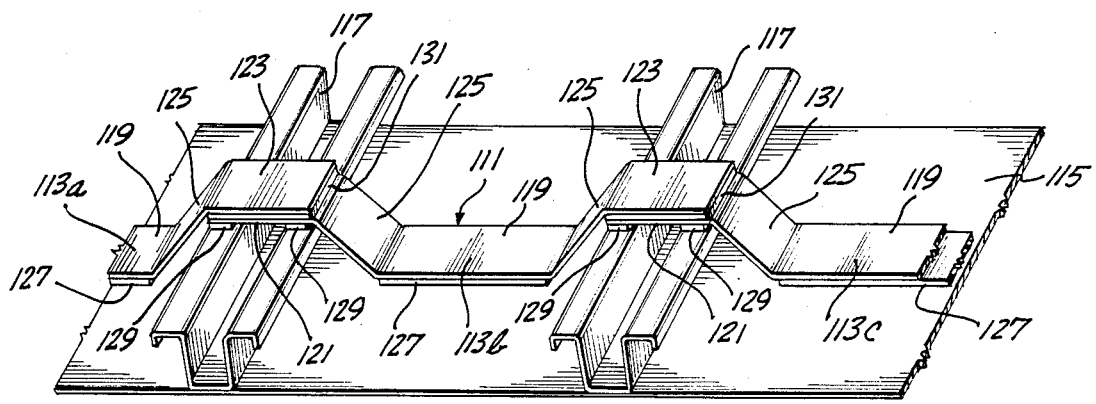
FIG. 6 is a perspective view of a still further embodiment of a constraining element formed in accordance with the invention.

FIG. 6 illustrates a constraining element 111 formed of a plurality of members 113a, 113b, 113c, etc. More specifically, FIG. 6 illustrates a skin 115 attached to a plurality of parallel oriented, top-hat stringers 117. The constraining element 111 lies transverse to the longitudinal axis of the stringers 117. The segments 113a, 113b and 113c forming the constraining element 111, when assembled, have a corrugated shape when viewed in a longitudinal cross-sectional plane.

Each of the segments 113a, 113b, 113c, etc. includes a center region 119 joined to a pair of outer regions 121 and 123 by inclined regions 125. The center regions 119 are attached by constraint-to-skin viscoelastic layers 127 to the skin 115 between pairs of stringers 117. In this regard, it will be appreciated that only two of a plurality of stringers are illustrated in FIG. 6 (and, for that matter, in the other figures). One of the pair of outer regions 121 of each segment 113a, 113b, 113c, etc. overlies the flanges of one of the stringers 117 and is viscoelastically attached thereto by a constraint-to-stringer viscoelastic layer 129. The other one of the pair of outer regions 123 of each segment overlies the flanges of the next adjacent stringer (to either the left or the right, but not both), and also overlies and is attached to the outer region of the segment extending into the next adjacent skin bay and attached to the underlying stringer flanges. Attachment between the over and underlying outer regions is via an intermediate viscoelastic layer 131. As a result, the segments 113a, 113b, 113c, etc. are viscoelastically attached to one another, and to the skin 115 and the stringers 117. The direct viscoelastic attachments directly damp vibrations of the elements (e.g., stringer or skin) to which they are attached and indirectly damp vibrations of the other element. The intermediate viscoelastic layer 131 indirectly assists in damping the vibrations of both elements. Moreover, the segments 113a, 113b, 113c, etc. can be apertured to reduce weight and the inclined regions 125 can be apertured and also include stiffening, if desired, as previously described with respect to the continuous constraining elements. Further, the width of the center and outer regions of the segments can be the same (as illustrated) or different.

Figure 7:
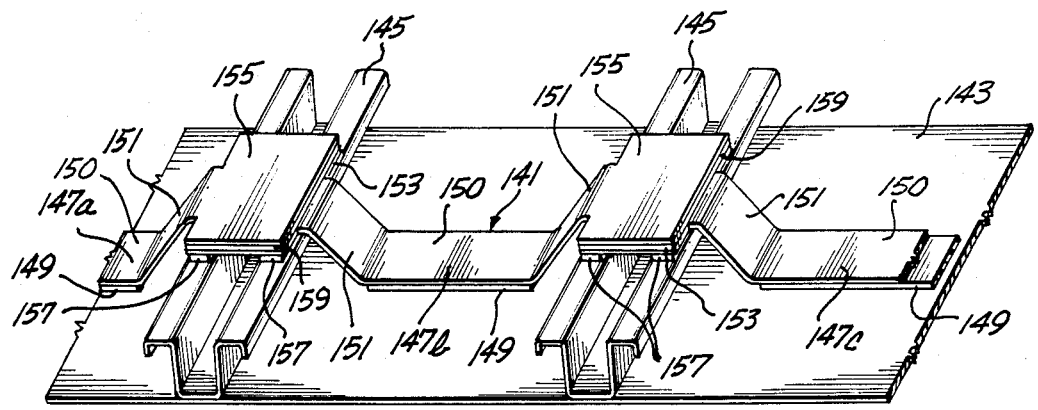
FIG. 7 is a perspective view of yet another embodiment of a constraining element formed in accordance with the invention.

FIG. 7 illustrates an alternative embodiment of a segmented constraining element 141 formed in accordance with the invention. More specifically, as with the other figures, FIG. 7 illustrates a skin 143 attached to a plurality of parallel oriented, top-hat stringers 145. The segments 147a, 147b, 147c, etc. of the constraining element 141, when assembled, lie transverse to the longitudinal axis of the stringers 145 and have a corrugated, longitudinal, cross-sectional configuration. The segments 147a, 147b, 147c, etc. are generally similar to the segments 113a, 113b, 113c, etc. illustrated in FIG. 6 in that each segment includes a center region 150 attached by a constraint-to-skin viscoelastic layer 149 to the skin 143 between adjacent stringers 145. In addition, each segment 147a, 147b, 147c, etc. includes a pair of inclined regions 151 that join the center region 150 to a pair of outer regions 153 and 155, which overlie adjacent stringers 145. One of the outer regions 153 of one segment 147b is affixed to the flanges of one of the adjacent stringers 145 by constraint-to-stringer viscoelastic layers 157. The other outer region 155 overlies and is attached by an intermediate viscoelastic layer 159 to the outer region 153 of an adjacent segment 147c, which is attached to the next adjacent stringer. In this manner one of the outer regions 155 of each segment, overlies the other outer region 153 of the next adjacent segment, and the other outer regions overlie the stringer. The primary difference between the FIG. 6 and FIG. 7 embodiments of a segmented constraining element formed in accordance with the invention is that the outer regions 153 attached to the flanges of the stringers 145 and the outer regions 155 that overlie the regions attached to the stringers 145 are wider than the other regions of the segments of the constraining element 141. Specifically, the outer regions 153 and 155 attached to the flanges of the stringers 145 are wider than the inclined regions 151 and the center regions 150 attached to the skin 143. Alternatively, the center regions (and the inclined regions) also can be wider than illustrated, if desired. Again, the constraining element segments can be apertured to reduce weight and the inclined regions can be stiffened.

Figure 8:
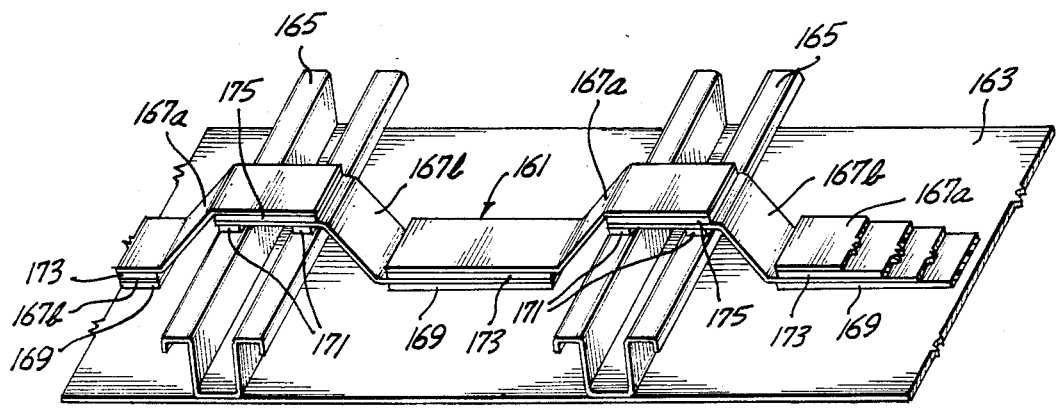
FIG. 8 is a perspective view of yet still another embodiment of a constraining element formed in accordance with the invention.

FIG. 8 illustrates another alternative embodiment of a segmented constraining element 161 formed in accordance with the invention. Again, for purposes of illustration, FIG. 8 includes a skin 163 attached to a plurality of parallel oriented, top-hat stringers 165. The constraining element 161 lies transverse to the longitudinal axis of the stringers 165. The segments 167a, 167b (which form the constraining element 161), when assembled in the manner herein described, form an elongated constraining element that has a corrugated, longitudinal, cross-sectional configuration. Each of the segments 167a, 167b of the constraining element 161 include a pair of offset regions joined by an inclined region. For purposes of discussion, one set of alternate pairs of segments 167a is denoted outer segments and the other set of alternate pairs of segments 167b is denoted inner segments. The inner segments 167b are viscoelastically attached to the stringers 165 and the skin 163 and the outer segments 167a are viscoelastically attached to the inner segments. More specifically, one of the offset regions of the inner segments 167b, is viscoelastically attached to the skin 163 by a constraint-to-skin viscoelastic layer 169, between a pair of adjacent stringers 165. The other offset region of the inner segments 167b, is attached to the flanges of one of the stringers 165 by a constraint-to-stringer viscoelastic layer 171. The outer segments 167a have one offset region attached by a first intermediate viscoelastic layer 173 to the offset region of an inner segment that is viscoelastically attached to the skin 163. The other offset region of the outer segments 167a is attached by a second intermediate viscoelastic layer 175 to the offset region of an inner segment that is viscoelastically attached to the flanges of a stringer 165. As a result, two viscoelastic layers, sandwiched between the stringer flanges and offset regions of the inner and outer segments, overlie the flanges of the stringers 165 and two viscoelastic layers, sandwiched between the skin and offset regions of the inner and outer segments overlie the skin 163. If desired, portions of the offset regions located between the flanges of the stringers 165 can be apertured. Similarly, the inclined regions of the segments can be apertured to reduce weight; and, include outwardly projecting edge flanges or other mechanisms to improve stiffness, as discussed above. Furthermore, additional segments 167a and 167b can be added to the constraining element 161 so as to overlie the illustrated segments so that more layers of viscoelastic material are sandwiched between the offset regions overlying the stringer and/or the skin.

Figure 9:
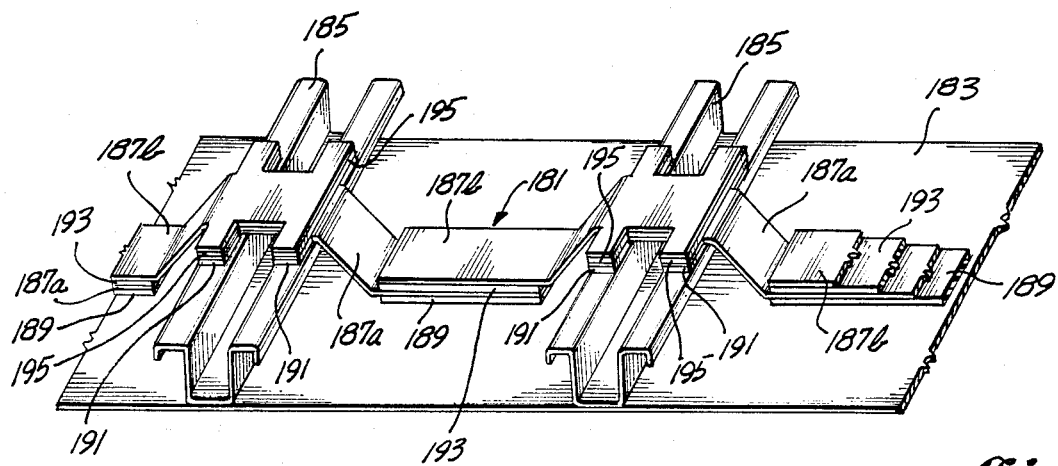
FIG. 9 is a perspective view of a yet still further embodiment of a constraining element formed in accordance with the invention.

FIG. 9 illustrates a still further alternative embodiment of a segmented constraining element 181 formed in accordance with the invention. More specifically, FIG. 9 illustrates a skin 183 connected to a plurality of parallel oriented, top-hat stringers 185. The constraining element 181 has a corrugated, longitudinal cross-sectional configuration and lies transverse to the longitudinal axis of the stringers 185. As with the segmented constraining element illustrated in FIG. 8, the segments making up the segmented constraining element 181 illustrated in FIG. 9 include a plurality of inner segments 187a and a plurality of outer segments 187b. Each of the segments includes two spaced apart offset regions joined by an inclined region. One of the offset regions of each of the inner segments 187a is attached by a constraint-to-skin viscoelastic layer 189 to the skin 183 between a pair of parallel stringers 185. The other offset region of the inner segments 187a are attached by constraint-to-stringer viscoelastic layers 191 to the flanges of an adjacent stringer 185. One of the offset regions of the outer segments 187b is viscoelastically attached by a first intermediate viscoelastic layer 193 to the offset region of an inner segment attached to the skin 183. The other offset region of an outer segment 187b is viscoelastically attached by a second intermediate viscoelastic layer 195 to the offset region of an adjacent inner segment 187a attached to the flanges of a stringer 185. Thus, the segmented constraining element 181 illustrated in FIG. 9 is generally similar to the segmented constraining element 161 illustrated in FIG. 8. The primary difference is that the offset regions of the segments attached to the flanges of the stringers 185 (both the offset regions directly attached and the offset regions overlying the directly attached offset regions) have an H-shaped configuration. The legs of the H-shaped configuration overlie the flanges of the stringers 185 and the cross-members span the flanges. The length of the legs of the H-shaped offset region is substantially greater than the width of the inclined and other offset regions of both the inner and outer segments 187a and 187b of the constraining element 181. Again, the segments can be apertured and the inclined region can include edge stiffening flanges, or other stiffening mechanisms.

Figure 10:
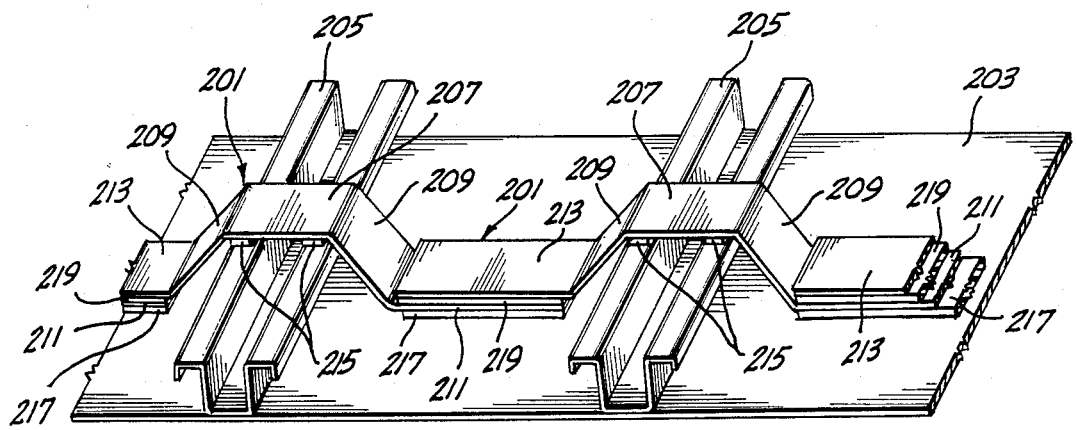
FIG. 10 is a perspective view of another further embodiment of a constraining element formed in accordance with the invention.

FIG. 10 illustrates yet another further alternative embodiment of a segmented constraining element 201 formed in accordance with the invention. More specifically, FIG. 10 illustrates a skin 203 connected to a plurality of parallel oriented, top-hat stringers 205. The constraining element 201 has a corrugated, longitudinal cross-sectional configuration and lies transverse to the longitudinal axis of the stringers 205. The segmented constraining element 201 illustrated in FIG. 10 includes a plurality of identical segments. Each segment includes a center region comprising a plateau 207 and a pair of outwardly diverging inclined legs 209. Each segment 201 also includes a pair of arms 211 and 213 projecting outwardly from the outer ends of the inclined legs 209. The outwardly projecting arms 211 and 213 lie generally parallel to the plateau 207 but are offset from one another by an amount generally equal to the thickness of an outwardly projecting arm and a viscoelastic layer.

The plateau 207 is attached to the flanges of a stringer 205 by constraint-to-stringer viscoelastic layers 215. One of the outwardly projecting arms 211 is attached to the skin 203 by a constraint-to-skin viscoelastic layer 217. The other outwardly projecting arm 213 overlies the outwardly projecting arm of the next adjacent segment 201, which overlies and is attached to the skin 203 by a constraint-to-skin viscoelastic layer 217. The overlying outwardly projecting arm 213 is attached to the outwardly projecting arm that it overlies by an intermediate viscoelastic layer 219.

It will be appreciated that the segmented constraining element 201 illustrated in FIG. 10 has the advantage of providing a plurality of viscoelastic layers sandwiched between the outwardly projecting arms of the constraining element in the region of the skin 203. The result is enhanced skin vibration damping. As with the other embodiments of the invention, the inclined regions 209 can be stiffened by outwardly projecting edge flanges or other stiffening mechanisms, as desired. In addition, the weight of the segmented constraining element 201 can be reduced by including apertures in the inclined region 209 and the region of the plateau 207 lying between the flanges of the stringers 205. Further, the width of the plateau and/or the outwardly projecting arms 211 and 213 can be substantially greater than the width of the inclined region 209, rather than the same (as shown), if desired.

FIGS. 1–10 illustrate embodiments of the invention wherein a skin is attached to a stringer and the stringer has the cross-sectional configuration of a top-hat. While the invention was developed for use in conjunction with top-hat stringers, the invention can also be used in conjunction with reinforcing members having other cross-sectional configurations. In this regard, by way of example, attention is directed to FIGS. 11–18.

Figure 11:
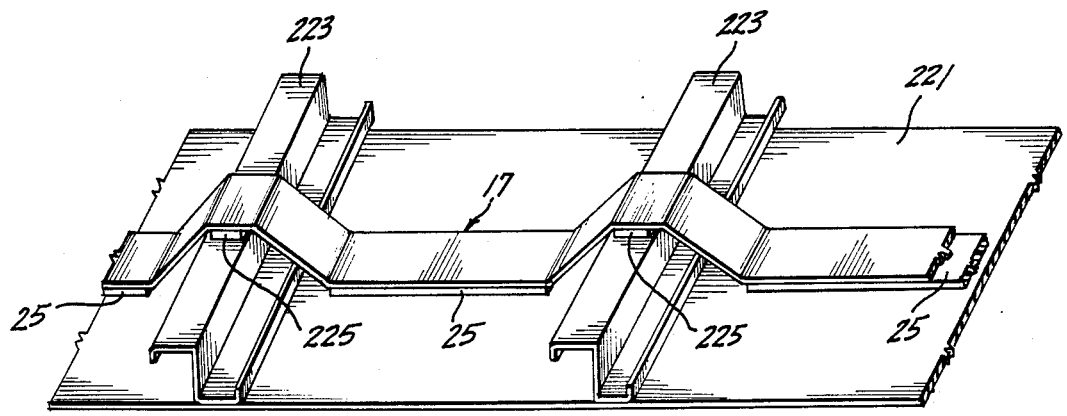
FIG. 11 is a perspective view of a constraining element of the type illustrated in FIG. 1 used with a differently shaped reinforcing member.

FIG. 11 illustrates a continuous constraining element 17 of the type illustrated in FIG. 1. More specifically, FIG. 11 illustrates a skin 221 and a plurality of Z-shaped reinforcing members 223 lying parallel to one another. The continuous constraining element 17 lies transverse to the longitudinal axis of the Z-shaped reinforcing members 223, which could be stringers, frames, etc. The constraining element 17 is attached by constraint-to-skin viscoelastic layers 25 to the skin 221 and by constraint-to-reinforcing member viscoelastic layers 225 to one of the flanges of the Z-shaped reinforcing member 223, the other flange being attached to the skin 221.

Figure 12:
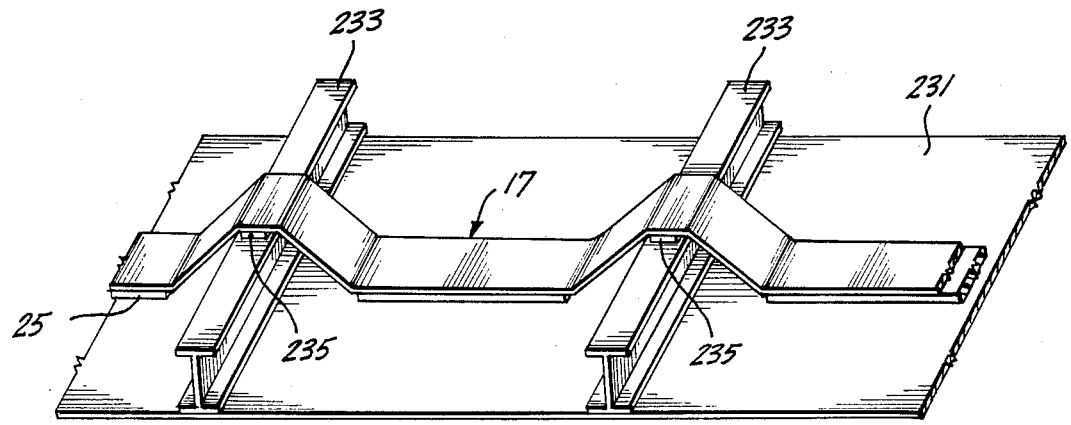
FIG. 12 is a perspective view of a constraining element of the type illustrated in FIG. 1 with a still differently shaped reinforcing member.

FIG. 12 also illustrates the embodiment of the invention including a continuous constraining element 17 of the type illustrated in FIG. 1. More specifically, FIG. 12 illustrates a skin 231 and a plurality of parallel oriented, I-shaped reinforcing members 233. The reinforcing members 233 lie parallel to one another and have one flange attached to skin 231. The continuous constraining element 17 lies transverse to the longitudinal axis of the reinforcing members 233. The constraining element 17 is attached by constraint-to-skin viscoelastic layers 25 to the skin 231. Constraint-to-reinforcing member viscoelastic layers 235 attach the constraining element 17 to the other flanges of the I-shaped reinforcing members 233.

As with the previously described embodiments of the invention, obviously, the inclined portions of the continuous constraining elements 17 illustrated in FIGS. 11 and 12, can include apertures to reduce weight and edge flanges or other stiffening mechanisms to increase the buckling strength of the inclined regions.

Figure 13:
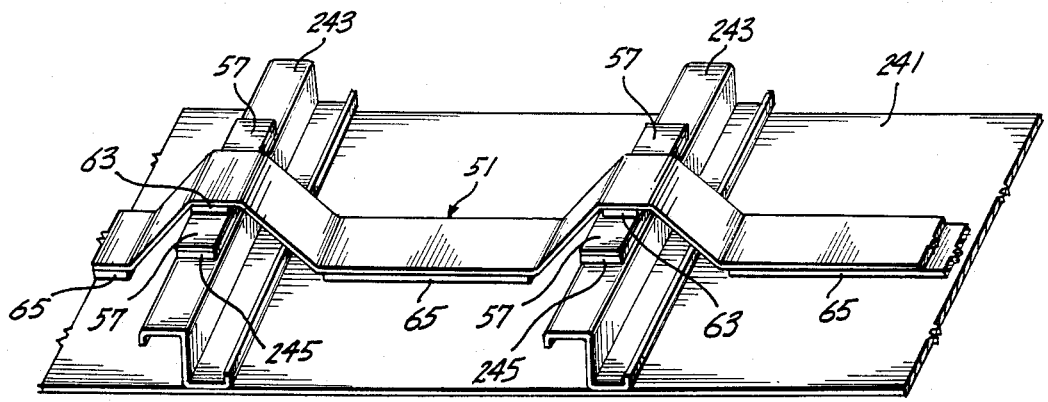
FIG. 13 is a perspective view of a constraining element of the type illustrated in FIG. 3 used with a differently shaped reinforcing member.
Figure 14:
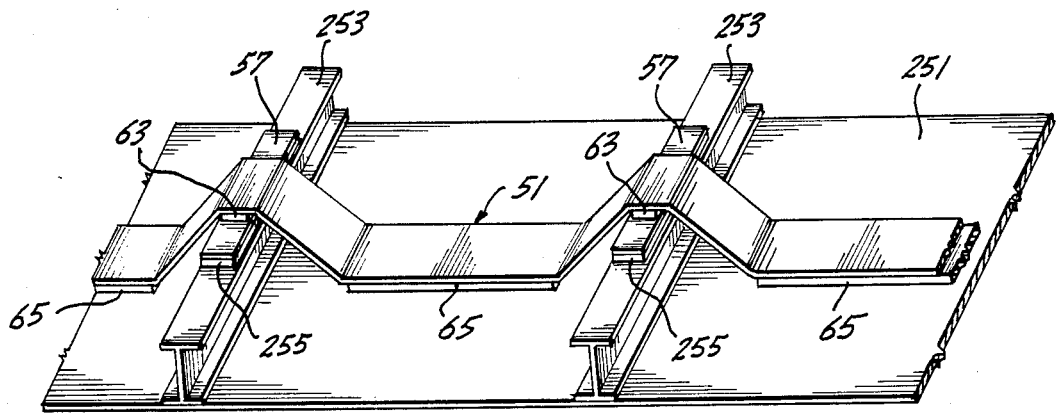
FIG. 14 is a perspective view of a constraining element of the type illustrated in FIG. 3 used with a still differently shaped reinforcing member.

FIGS. 13 and 14 illustrate continuous constraining elements 51 of the type illustrated in FIG. 3 and previously described used in a reinforced skin structure including reinforcing members of the type illustrated in FIGS. 11 and 12, respectively. More specifically, FIG. 13 illustrates a skin 241 attached to a plurality of parallel oriented, Z-shaped reinforcing members 243. The continuous constraining element 51 lies transverse to the longitudinal axis of the Z-shaped reinforcing members 243. Constraint-to-skin viscoelastic layers 65 attach the constraining element 51 to the skin 241. In addition, constraint-to-plate viscoelastic layers 63 attach the constraining element 51 to a plate 57 that in turn is attached by plate-to-reinforcing member viscoelastic layers 245 to the flanges of the Z-shaped reinforcing members 243. The other flange, of course, is attached to the skin 241.

In FIG. 14, a skin 251 is attached to one flange of a plurality of parallel oriented, I-shaped reinforcing members 253. The constraining element 51 is mounted transverse to the longitudinal axis of the reinforcing members 253. The constraining element 51 is attached by constraint-to-skin viscoelastic layers 65 to the skin 251. In addition a constraint-to-plate viscoelastic layer 63 attaches the constraining element 51 to plates 57 which in turn are attached to the other flanges of the I-shaped reinforcing members by plate-to-reinforcing member viscoelastic layers 255.

As with the other embodiments of the invention, the inclined regions of the constraining element 51 illustrated in FIGS. 13 and 14 can be apertured to reduce weight. In addition, the inclined regions may include edge flanges or other stiffening mechanisms. Also, the portion of the constraining element overlying the plates and/or overlying the skin can be substantially wider than illustrated, if desired.

Figure 15:
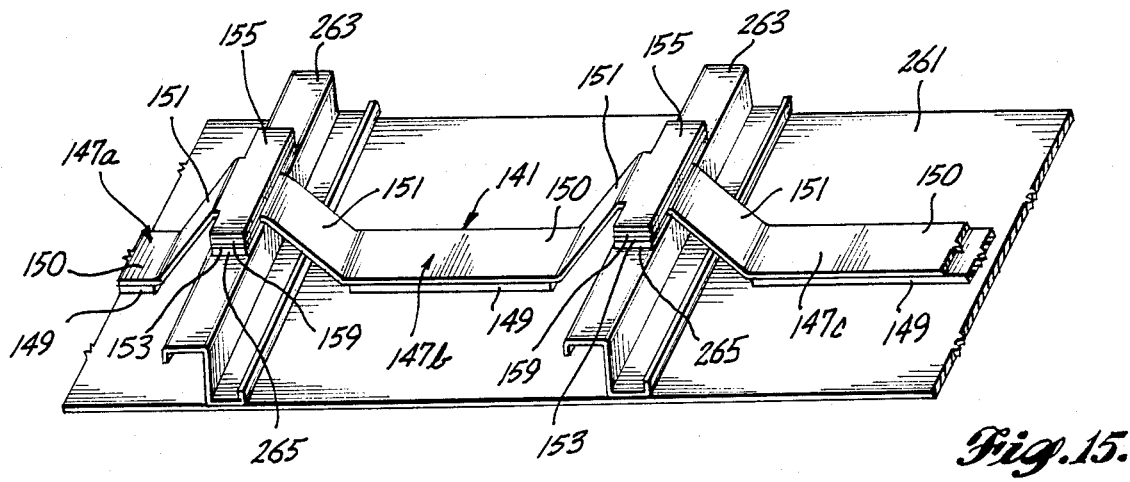
FIG. 15 is a perspective view of a constraining element of the type illustrated in FIG. 7 used with a differently shaped reinforcing member.
Figure 16:
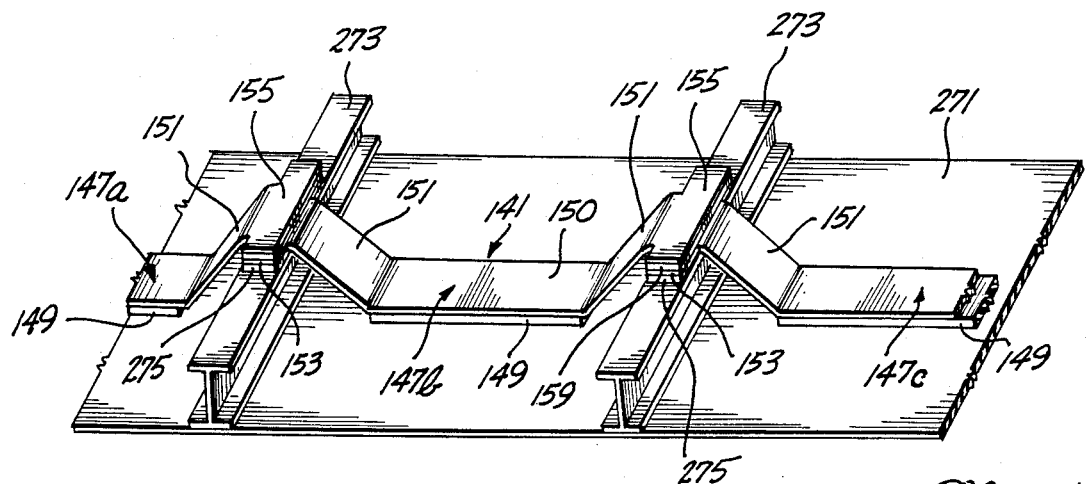
FIG. 16 is a perspective view of a constraining element of the type illustrated in FIG. 7 with a still differently shaped reinforcing member.

FIGS. 15 and 16 illustrate segmented constraining elements 141 of the type generally illustrated in FIG. 7 mounted in reinforced skin structures including reinforcing members of the type generally illustrated in FIGS. 11 and 12 and previously described. More specifically, FIG. 15 illustrates a skin 261 attached to one flange of parallel oriented, Z-shaped reinforcing members 263. The segmented constraining element 141 lies transverse to the longitudinal axis of the Z-shaped reinforcing members 263. As in FIG. 7, the segmented constraining element 141 includes a plurality of segments 147a, 147b, 147c, etc. Each segment includes a center region 150 attached by a constraint-to-skin viscoelastic layer 149 to the skin 261. In addition, each segment 147a, 147b, 147c, etc. includes a pair of inclined regions 151 that join the center region 150 to a pair of outer regions 153 and 155, which overlie the other flanges of the Z-shaped reinforcing members 263. One of the outer regions 153 of one segment 147b is affixed to the flanges of one of the adjacent reinforcing members 263 by a constraint-to-reinforcing member viscoelastic layer 265. The other outer region 155 overlies and is attached by an intermediate viscoelastic layer 159 to the outer region 153 of the adjacent segment, which is also attached to the next adjacent reinforcing member.

FIG. 16 illustrates a skin 271 attached to one flange of parallel oriented, I-shaped reinforcing members 273. The segmented constraining element 141 lies transverse to the longitudinal axis of the I-shaped reinforcing members 273. As in FIGS. 7 and 15, the segmented constraining element 141 includes a plurality of segments 147a, 147b, 147c, etc. each of which includes a center region 150 that is attached by a constraint-to-viscoelastic layer 149 to the skin 271. Further, each segment includes a pair of inclined regions 151 that attach the center region 150 to a pair of outer regions 153 and 155. The outer regions 153 and 155 overlie the other flanges of adjacent I-shaped reinforcing members 273.

Further, one of the outer regions 153 of one segment 147b is affixed to the flanges of one of the adjacent reinforcing members 273 by constraint-to-reinforcing member viscoelastic layers 275. The other outer region 155 overlies and is attached by an intermediate viscoelastic layer 159 to the outer region 53 of an adjacent segment 147c that is attached to a reinforcing member 273. In this manner one of the outer regions 155 of each segment overlies the other outer region 153 of the next adjacent segment; and, the other outer regions overlie the reinforcing members 273.

Figure 17:
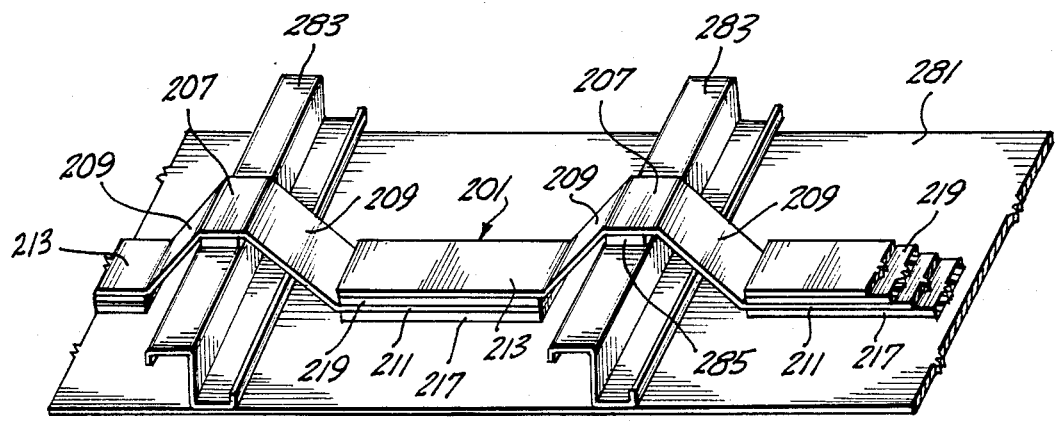
FIG. 17 is a perspective view of a constraining element of the type illustrated in FIG. 10 with a differently shaped reinforcing member.
Figure 18:
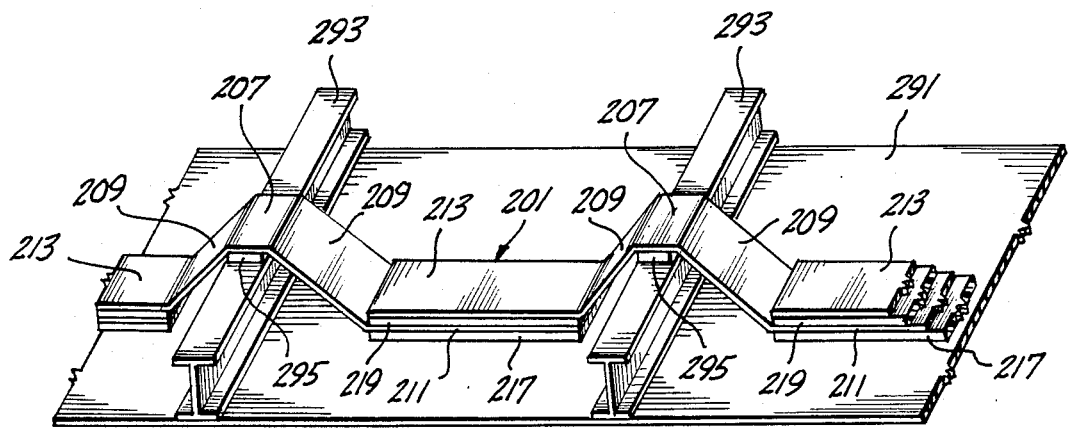
FIG. 18 is a perspective view of a constraining element of the type illustrated in FIG. 10 with a still differently shaped reinforcing member; and, FIG. 19 is a perspective view of constraining elements formed in accordance with the invention extending between reinforcing members and between the reinforcing members and the skin of a reinforced skin structure.
Figure 19:
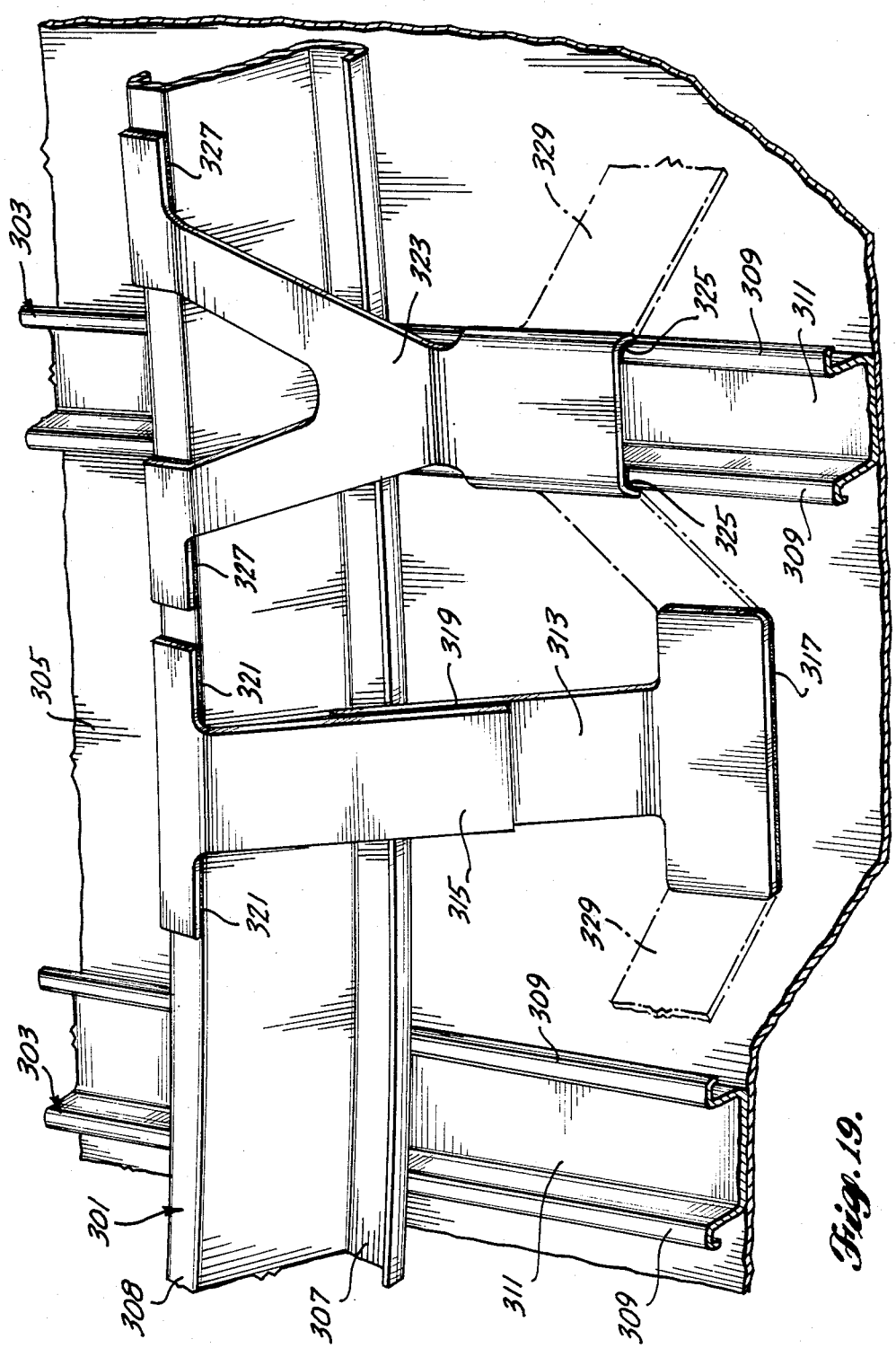

FIGS. 17 and 18 illustrate segmented constraining elements 201 of the type illustrated in FIG. 10 used in reinforced structures that include reinforcing elements having Z and I-shaped cross-sectional configurations, respectively. More specifically, FIG. 17 illustrates a skin 281 attached to the flanges of a plurality of parallel oriented, Z-shaped reinforcing members 283. The segmented constraining element 201 lies transverse to the longitudinal axis of the Z-shaped reinforcing members. The plateaus 207 of the segments of the segmented constraining element 201 are viscoelastically attached by constraint-to-reinforcing member viscoelastic layers 285 to the other flanges of the Z-shaped reinforcing members. The outwardly projecting arms 211 and 213 of the segments are attached either to the skin 281 or the outwardly projecting arm of the next adjacent segment in a similar manner as the outwardly projecting arms were viscoelastically attached in the embodiment of the invention illustrated in FIG. 10 and previously described. In FIG. 18 a skin 291 is illustrated as attached to the flanges of a plurality of parallel oriented, I-shaped reinforcing members 293. The segmented constraining element 201 lies transverse to the longitudinal axis of the reinforcing members 293. The plateaus 207 of the reinforcing elements overlie and are attached to the other flanges of the I-shaped reinforcing members 293 by constraint-to-reinforcing member viscoelastic layers 295. The outwradly projecting arms 211 and 213 of the segments of the segmented constraining element 201 are viscoelastically attached to the skin 291 and to each other by constraint-to-skin viscoelastic layers 217 and intermediate viscoelastic layers 219 in the same manner as these elements were attached to skin and one another in the embodiment of the invention illustrated in FIG. 10 and previously described.

While not illustrated in the drawings, obviously, the other configurations of the invention illustrated in FIGS. 2, 3, 4, 5, 8 and 9 can be utilized with Z-shaped and I-shaped reinforcing elements of the type illustrated in FIGS. 11-18. Moreover, as noted below, reinforcing members having other cross-sectional configurations can be utilized with the various types of segmented and continuous constraining element formed in accordance with the invention.

FIG. 19 illustrates an embodiment of the invention wherein constraining elements extend between reinforcing members that support one another, such as a frame 301 and stringers 303, as well as between the reinforcing members and a skin 305. More specifically, the frame 301 (which may be a frame element of an aircraft fuselage) supports a plurality of stringers 303. The frame is illustrated as having a return flange Z-shaped cross-sectional configuration and the stringers are illustrated as having a return flange hat shaped cross-sectional configuration. The stringers lie parallel to one another and orthogonal to the frame. One flange 307 of the frame 301 is affixed to the flanges 309 of the stringers in any suitable manner, such as by rivets, bolts, or frame-to-stringe clips for examples. The skin 305 is affixed to the cross-member 311 of the stringers 303 by any suitable means, e.g., rivets or bolts.

Two exemplary types of constraining elements are illustrated in FIG. 19. The first constraining element includes two overlapping T-shaped components 313 and 315. The cross-member of the first T-shaped component 313 is attached to the skin 305, between a pair of adjacent stringers 303, by a constraint-to-skin viscoelastic layer 317. The leg of the first T-shaped component 313 extends away from the skin 305, toward the remote flange 308 of the frame 301. The leg of the second T-shaped component 315 overlies the leg of the first T-shaped component 313. The legs are attached by a leg-to-leg viscoelastic layer 319. The cross-member of the second T-shaped component 315 overlies the remote flange 308 of the frame 301 and is attached thereto by a constraint-to-frame viscoelastic layer 321. As with the previously described embodiments of the invention, the first constraining element directly and indirectly damps vibrations of both the skin 305 and the frame 301. The leg-to-leg viscoelastic layer also indirectly damps vibrations of the skin 305 and the frame 301.

The second constraining element illustrated in FIG. 19 includes a V-shaped component 323. The apex of the V-shaped component 323 includes a unitary flange that overlies the flanges 309 of an associated stringer 303 and is attached thereto by constrain-to-flange viscoelastic layers 325. The legs of the V-shaped component extend away from the stringer 303 toward the remote flange 308 of the frame 301. Each leg includes a unitary flange that overlies the remote flange 308 of the frame 301 and is attached thereto by a constraint-to-frame viscoelastic layer 327. As a result, the second constraining element directly and indirectly damps vibrations of the associated stringer 303 and the frame 301.

If desired, as illustrated by dashed lines in FIG. 19, the cross-member of the first T-shaped component 317 can be attached to the apex flange of the V-shaped component 323 by a unitary bridge 329. Such a structure has the advantage that all three elements (e.g., the frame 301, stringers 303 and skin 305) are viscoelastic attached together, whereby each viscoelastic attachment directly or indirectly provides vibration damping when any one of the three elements vibrates.

As will be readily appreciated from the foregoing description, the method and apparatus of the invention provides for damping the vibrations of a reinforced skin structure over a wide frequency range in order to reduce the interior noise and improve the sonic fatigue life of the structure. Bending, torsional and tuning fork vibrations of the reinforcing members are all damped. Further, the vibration of both cylindrical and panel skin structures is damped. In addition to the direct damping created by the viscoelastic attachment of a region of the constraining element to a particular item (e.g., reinforcing member or skin), indirect vibration damping of the element occurs due to the connections coupling the regions together. In essence, all vibrational modes of the reinforcing members and the skin are damped by the constraining elements of the invention.

While the reinforcing members have been illustrated as having top-hat, Z-shaped and I-shaped cross-sectional configurations, because these configurations are commonly used in aircraft, it will be appreciated that the invention can be utilized with reinforcing members having other cross-sectional shapes. For example, the invention can be used with H, C, T, integrally stiffened, square and rectangular cross-sectionally sahped reinforcing members. Further, while the constraining element can be formed of various metals and plastics of varying thicknesses, in an aircraft environment, preferably, the constraining elements are formed of the same material and have a thickness less than or at most times equal to the thickness of the reinforcing members.

It will be appreciated that, while preferred embodiments of constraining elements have been illustrated and described, the constraining elements can take on other configurations, if desired. All that is necessary is that the constraining elements provide regions that can be viscoelastically attached to the skin and the reinforcing members plus include a coupling region. Moreover, in addition to stiffening inclined regions by the use of edge flanges, as described herein, the regions attached to the reinforcing members and to the skin may be reinforced by outwardly bent flanges, if desired. Further, as an alternative to flanges, various areas of the inclined and other regions can be ribbed or in other manners, modified to provide stiffness, if desired. Hence, the invention can be practiced otherwise than as specifically described herein.

The embodiments of the invention in which an exclusive property or privilege is claimed are defined as follows:

1. A method of damping the vibrations of spaced-apart vibrating regions of selected different elements of the skin and reinforcing members of a reinforced skin structure, said method comprising the steps of:
    bridging the space between said spaced-apart vibrating regions of said selected different elements of the skin and reinforcing members of said reinforced skin structure with an elongate, rigid constraining element having flat regions positioned to overlie each of the spaced-apart vibrating regions of said selected different elements of the skin and reinforcing members of said reinforced skin structure; and,
    attaching each of said overlying flat regions of said elongate, rigid constraining element to the underlying vibrating region of said selected different elements of the skin and reinforcing members of said reinforced skin structure with a layer of viscoelastic material.

2. The method of damping the vibrations of spaced-apart vibrating regions of selected different elements of the skin and reinforcing members of a reinforced skin structure claimed in claim 7 wherein said elongate, rigid constraining element is continuous and wherein every other flat region of said elongate, rigid constraining element is attached to the same type of element of said selected different elements of said skin and said reinforcing members by said layers of viscoelastic material.

3. The method of damping the vibrations of spaced-apart vibrating regions of selected different elements of the skin and reinforcing members of a reinforced skin structure claimed in claim 2 wherein:
    said reinforcing members of said reinforced skin structure include a plurality of parallel oriented, spaced-apart reinforcing members and said skin is attached to said plurality of parallel oriented, spaced-apart reinforcing members;
    said elongate, rigid constraining elements have a corrugated, longitudinal, cross-sectional configuration, said corrugations having flat tops that form said flat regions of said elongate, rigid constraining element; and,
    said elongate, rigid constraining element is sized and oriented so as to overlie both said parallel oriented, spaced-apart reinforcing members and said skin such that said flat tops are aligned with vibrating regions of said parallel oriented, spaced-apart reinforcing members and said skin.

4. The method of damping the vibrations of spaced-apart vibrating regions of selected different elements of the skin and reinforcing members of a reinforced skin structure claimed in claim 1 wherein said elongate, rigid constraining element is segmented and wherein alternate flat regions of said elongate, rigid constraining element are attached to the same element of said selected different elements of said skin and reinforcing members by said layers of viscoelastic material.

5. The method of damping the vibrations of spaced-apart vibrating regions of selected different elements of the skin and reinforcing members of a reinforced skin structure claimed in claim 4 wherein:
    said reinforcing members of said reinforced skin structure include a plurality of parallel oriented, spaced-apart reinforcing members and said skin is attached to said plurality of parallel oriented, spaced-apart reinforcing members;
    said elongate, rigid constraining elements have a corrugated, longitudinal, cross-sectional configuration, said corrugations having flat tops that form said flat regions of said elongate, rigid constraining element; and,
    said elongate, rigid constraining element is sized and oriented so as to overlie both said parallel oriented, spaced-apart reinforcing members and said skin such that said flat tops are aligned with vibrating regions of said parallel oriented, spaced-apart reinforcing members and said skin.

6. The method of damping the vibrations of spaced-apart vibrating regions of selected different elements of the skin and reinforcing members of a reinforced skin structure claimed in claim 5 wherein the segments of said segmented, elongate rigid constraining element overlap, said overlap occurring in selected flat top corrugation regions, and wherein said overlapping portions of said selected flat top corrugation regions are viscoelastically attached to one another.

7. In a reinforced skin structure wherein a skin is supported by reinforcing members, the improvement comprising apparatus for damping the vibrations of spaced-apart vibrating regions of the skin and reinforcing members of said reinforced skin structure over a wide frequency band, said apparatus comprising:
    at least one elongate, rigid constraining element for connecting together the spaced-apart vibrating regions of selected different elements of said skin and reinforcing members, said at least one elongate, rigid constraining element having spaced-apart flat regions, said at least one elongate, rigid constraining element configured and oriented such that said flat regions overlie spaced-apart vibrating regions of said selected different elements of said skin and reinforcing members;
    first viscoelastic layer means for viscoelastically attaching at least one flat region of said at least one elongate, rigid constraining element to an underlying vibrating region of a first one of said selected elements of said skin and reinforcing members; and,
    second viscoelastic layer means for viscoelastically attaching at least one other flat region of said at least one elongate, rigid constraining element to an underlying vibrating region of a different one of said selected elements of said skin and reinforcing members.

8. The improvement claimed in claim 7 wherein said elongate, rigid constraining element is continuous.

9. The improvement claimed in claim 7 wherein said elongate, rigid constraining element is segmented.

10. The improvement claimed in claim 7 wherein selected regions of said elongate, rigid constraining element include weight reducing apertures.

11. The improvement claimed in claim 7 wherein:
said reinforcing members include a plurality of parallel oriented, spaced-apart reinforcing members and said skin is attached to said plurality of parallel oriented, spaced-apart reinforcing members;
said skin and said plurality of parallel oriented, spaced-apart reinforcing members form said selected different elements of said reinforced skin structure;
said at least one elongate, rigid constraining element has a longitudinal, cross-sectional configuration that defines corrugations lying transverse to the longitudinal axis of said elongate, rigid constraining element, said corrugations having flat tops that form said flat regions of said at least one rigid, elongate constraining element;
said elongate, rigid constraining element is sized and oriented such that said flat tops alternately overlie vibrating regions of said skin and said plurality of parallel oriented, spaced-apart reinforcing members;
said first viscoelastic layer means attaches the flat tops that overlie said plurality of parallel oriented, spaced-apart reinforcing members to said plurality of parallel oriented, spaced-apart reinforcing members; and,
said second viscoelastic layer means attaches the flat tops that overlie said skin to said skin.

12. The improvement claimed in claim 11 wherein said at least one elongate, rigid constraining element includes flat, inclined regions lying between said flat tops, said flat inclined regions including longitudinal strengthening means for preventing the transverse buckling of said inclined regions.

13. The improvement claimed in claim 12 wherein said longitudinal strengthening means comprises flanges that extend orthogonally outwardly from the longitudinal edges of said inclined regions.

14. The improvement claimed in claim 7 including:
a plurality of plates, one of said plates lying between each of the flat tops of said at least one elongate, rigid constraining element that overlie said plurality of parallel oriented, spaced-apart reinforcing members and the underlying parallel oriented, spaced-apart reinforcing member, said plurality of plates attached to their overlying flat tops by said second viscoelastic layer means; and,
third viscoelastic layer means for viscoelastically attaching said plurality of plates to the parallel oriented, spaced-apart reinforcing members that they overlie.

15. The improvement claimed in claim 14, wherein said plates have an H-shaped planar configuration.

16. The improvement claimed in claim 7 wherein the tops of said at least one elongate, rigid constraining element that are viscoelastically attached to said plurality of parallel oriented, spaced-apart reinforcing members have a substantially greater width than the width of the remainder of said constraining element.

17. Apparatus for vibration damping reinforced structures comprising:
an elongate, rigid constraining element having at least one first and at least one second flat attachment regions joined by a nonattachment region;
first viscoelastic layer means located on one face of said at least one first flat attachment region of said constraining element for attaching said at least one first flat attachment region to a first component of a reinforced skin structure; and,
second viscoelastic layer means located on one face of said at least one second flat attachment region of said constraining element for attaching said at least one second flat attachment region to a second component of said reinforced skin structure.

18. The apparatus for vibration damping reinforced structures claimed in claim 17 wherein said elongate, rigid constraining element includes weight reducing apertures.

19. The apparatus for vibration damping reinforced structures claimed in claim 17 wherein said elongate, rigid constraining element includes stiffening means for stiffening selected regions of said elongate, rigid constraining element to prevent said constraining element from buckling in said selected regions.

20. The apparatus for vibration damping reinforced structures as claimed in claim 17 wherein said elongate, rigid constraining element is continuous.

21. The apparatus for vibration damping reinforced structures claimed in claim 20 wherein said elongate, rigid constraining element includes weight reducing apertures.

22. The apparatus for vibration damping reinforced structures claimed in claim 21 wherein said elongate, rigid constraining element includes stiffening means for stiffening selected regions of said constraining element to prevent said constraining element from buckling in said selected regions.

23. The apparatus for vibration damping reinforced structures claimed in claim 20 wherein said elongate, rigid constraining element includes weight reducing apertures.

24. The apparatus for vibration damping reinforced structures claimed in claim 23 wherein said elongate, rigid constraining element includes stiffening means for stiffening selected regions of said constraining element to prevent said constraining element from buckling in said selected regions.

25. The apparatus for vibration damping reinforced structures claimed in claim 20 wherein said elongate, rigid constraining element includes stiffening means for stiffening selected regions of said constraining element to prevent said constraining element from buckling in said selected regions.

26. The apparatus for vibration damping reinforced structures claimed in claim 17 wherein said elongate, rigid constraining element is segmented.

27. The apparatus for vibration damping reinforced structures claimed in claim 26 wherein said segments of said elongate, rigid constraining element overlap and including third viscoelastic layer means located between and attaching together the facing surfaces of the overlapping regions of said segments.

28. The apparatus for vibration damping reinforced structures claimed in claim 27 wherein said elongate, rigid constraining element includes weight reducing apertures.

29. The apparatus for vibration damping reinforced structures claimed in claim 27 wherein said elongate, rigid constraining element includes stiffening means for stiffening selected regions of said constraining element to prevent said constraining element from buckling in said selected regions.

30. Apparatus for vibration damping reinforced skin structures comprising:
   an elongate, rigid constraining element having a longitudinal, cross-sectional configuration that defines corrugations lying transverse to the longitudinal axis of said elongate, rigid constraining element, said corrugations having flat tops, the flat tops of alternating corrugations forming first and second sets of flat attachment regions;
   first viscoelastic layer means located on one face of said first set of flat attachment regions for attaching said first set of flat attachment regions to the reinforcing members of a reinforced skin structure; and,
   second viscoelastic layer means located on one face of said second set of flat attachment regions for attaching said second set of flat attachment regions to the skin of said reinforced skin structure.

31. The apparatus for vibration damping reinforced skin structures claimed in claim 30 wherein said elongate, rigid constraining element includes weight reducing apertures.

32. The apparatus for vibration damping reinforced skin structures claimed in claim 30 wherein said elongate, rigid constraining element includes stiffening means for stiffening the regions of said constraining element lying between said first and second sets of flat attachment regions to prevent said constraining element from buckling in said in between regions.

33. The apparatus for vibration damping reinforced skin structures claimed in claim 30 wherein said first set of flat attachment regions of said elongate, rigid constraining element are wider than the other portions of said constraining element.

34. The apparatus for vibration damping reinforced skin structures as claimed in claim 30 wherein said elongate, rigid constraining element is continuous.

35. The apparatus for vibration damping reinforced skin structures claimed in claim 32 wherein said elongate, rigid constraining element includes weight reducing apertures.

36. The apparatus for vibration damping reinforced skin structures claimed in claim 35 wherein said elongate, rigid constraining element includes stiffening means for stiffening selected regions of said constraining element to prevent said constraining element from buckling in said selected regions.

37. The apparatus for vibration damping reinforced skin structures claimed in claim 36 wherein said first set of flat attachment regions of said elongate, rigid constraining element are wider than the other portions of said constraining element.

38. The apparatus for vibration damping reinforced skin structures claimed in claim 34 wherein said elongate, rigid constraining element includes weight reducing apertures.

39. The apparatus for vibration damping reinforced skin structures claimed in claim 38 wherein said elongate, rigid constraining element includes stiffening means for stiffening selected regions of said constraining element to prevent said constraining element from buckling in said selected regions.

40. The apparatus for vibration damping reinforced skin structures claimed in claim 39 wherein said first set of flat attachment regions of said elongate, rigid constraining elements are wider than the other portions of said constraining element.

41. The apparatus for vibration damping reinforced skin structures claimed in claim 34 wherein said elongate, rigid constraining element includes stiffening means for stiffening the regions of said constraining element lying between said first and second sets of flat attachment regions to prevent said constraining element from buckling in said in between regions.

42. The apparatus for vibration damping reinforced skin structures claimed in claim 41 wherein said first set of flat attachment regions of said elongate, rigid constraining element are wider than the other portions of said constraining element.

43. The apparatus for vibration damping reinforced skin structures claimed in claim 34 wherein said first set of flat attachment regions of said elongate, rigid constraining element are wider than the other portions of said constraining element.

44. The apparatus for vibration damping reinforced skin structures claimed in claim 30 wherein said elongate, rigid constraining element is segmented.

45. The apparatus for vibration damping reinforced skin structures claimed in claim 44 wherein the segments of said elongate, rigid constraining element overlap and including third viscoelastic layer means located between and attaching together the facing surfaces of the overlapping regions of said segments.

46. The apparatus for vibration damping reinforced skin structures claimed in claim 45 wherein said overlapping regions are located in the same area of said elongate, rigid constraining element as said first set of flat attachment regions.

47. The apparatus for vibration damping reinforced skin structures claimed in claim 46 wherein said overlapping regions are also located in the same area of said elongate, rigid constraining element as said second set of flat attachment regions.

48. The apparatus for vibration damping reinforced skin structures claimed in claim 45 wherein said overlapping regions are located in the same area of said elongate, rigid constraining element as said second set of flat attachment regions.

49. The apparatus for vibration damping reinforced skin structures claimed in claim 45 wherein said elongate, rigid constraining element includes weight reducing apertures.

50. The apparatus for vibration damping reinforced skin structures claimed in claim 45 wherein said elongate, rigid constraining element includes stiffening means for stiffening the regions of said constraining element lying between said first and second sets of flat attachment regions to prevent said constraining elements from buckling in said in between regions.

51. The apparatus for vibration damping reinforced skin structures claimed in claim 45 wherein said first set of flat attachment regions of said elongate, rigid constraining element are wider than the other portions of said constraining element.

* * * * *

UNITED STATES PATENT AND TRADEMARK OFFICE
CERTIFICATE OF CORRECTION

PATENT NO. : 4,828,202

DATED : May 9, 1989

INVENTOR(S) : Jacobs et al.

It is certified that error appears in the above-identified patent and that said Letters Patent is hereby corrected as shown below:

Column 23, line 47: "32" should be --34--

Signed and Sealed this

Twenty-first Day of August, 1990

Attest:

HARRY F. MANBECK, JR.

*Attesting Officer*                    *Commissioner of Patents and Trademarks*